United States Patent
Kennedy, III et al.

(10) Patent No.: US 7,591,740 B2
(45) Date of Patent: *Sep. 22, 2009

(54) GOLF BALL WHICH INCLUDES FAST-CHEMICAL-REACTION-PRODUCED COMPONENT AND METHOD OF MAKING SAME

(75) Inventors: Thomas J. Kennedy, III, Wilbraham, MA (US); Michael J. Tzivanis, Chicopee, MA (US); David M. Melanson, Fedding Hills, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/927,184

(22) Filed: Oct. 29, 2007

(65) Prior Publication Data

US 2008/0132357 A1 Jun. 5, 2008

Related U.S. Application Data

(63) Continuation of application No. 11/475,788, filed on Jun. 27, 2006, which is a continuation of application No. 10/905,913, filed on Jan. 26, 2005, now Pat. No. 7,244,196.

(51) Int. Cl.
A63B 37/06 (2006.01)
(52) U.S. Cl. .................................................. 473/374
(58) Field of Classification Search ................. 473/373, 473/374
See application file for complete search history.

(56) References Cited

U.S. PATENT DOCUMENTS

| | | |
|---|---|---|
| 2,741,480 A | 4/1956 | Smith |
| 2,973,800 A | 3/1961 | Muccino |
| 3,053,539 A | 9/1962 | Picchowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al |
| 3,395,109 A | 7/1968 | Molitor et al |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al |
| 3,979,126 A | 9/1976 | Dusbiber |
| 3,989,568 A | 11/1976 | Isaac |
| 4,076,255 A | 2/1978 | Moore et al. |
| 4,085,937 A | 4/1978 | Schenk |
| 4,123,061 A | 10/1978 | Dusbiber |
| 4,190,711 A | 2/1980 | Zdrahala et al. |
| 4,218,543 A | 8/1980 | Weber et al. |
| 4,248,432 A | 2/1981 | Hewitt et al. |

(Continued)

Primary Examiner—Raeann Trimiew
(74) Attorney, Agent, or Firm—Michael A. Catania; Elaine H. Lo

(57) ABSTRACT

Disclosed herein is a golf ball comprising fast-chemical-reaction-produced component, such as a component which comprises a reaction injection molded polyurethane material. The golf ball has excellent light stability. Also disclosed is a method making a golf ball by forming a cover component of the ball by mixing two or more reactants that react and form a reaction product with a flex modulus of from about 1 to about 310 kpsi in a reaction time of about 5 minutes or less, the component having a thickness of at least 0.01 inches and a demold time of 10 minutes or less.

5 Claims, 3 Drawing Sheets

U.S. PATENT DOCUMENTS

| | | | |
|---|---|---|---|
| 4,272,079 | A | 6/1981 | Nakade et al. |
| 4,274,637 | A | 6/1981 | Molitor |
| 4,337,946 | A | 7/1982 | Saito et al. |
| 4,431,193 | A | 2/1984 | Nesbitt |
| 4,442,282 | A | 4/1984 | Kolycheck |
| 4,570,937 | A | 2/1986 | Yamada |
| 4,582,887 | A | 4/1986 | Dominguez et al. |
| 4,590,219 | A | 5/1986 | Nissen et al. |
| 4,607,090 | A | 8/1986 | Dominguez |
| 4,650,193 | A | 3/1987 | Molitor et al. |
| 4,674,751 | A | 6/1987 | Molitor et al. |
| 4,679,795 | A | 7/1987 | Melvin et al. |
| 4,688,801 | A | 8/1987 | Reiter |
| 4,690,981 | A | 9/1987 | Slatz |
| 4,695,055 | A | 9/1987 | Newcomb et al. |
| 4,714,253 | A | 12/1987 | Nakahara et al. |
| 4,762,322 | A | 8/1988 | Molitor et al. |
| 4,798,386 | A | 1/1989 | Berard |
| 4,848,770 | A | 7/1989 | Shama |
| 4,852,884 | A | 8/1989 | Sullivan |
| 4,858,923 | A | 8/1989 | Gobush et al. |
| 4,858,924 | A | 8/1989 | Saito et al. |
| 4,878,674 | A | 11/1989 | Newcomb et al. |
| 4,884,814 | A | 12/1989 | Sullivan |
| 4,911,451 | A | 3/1990 | Sullivan et al. |
| 4,919,434 | A | 4/1990 | Saito |
| 4,957,297 | A | 9/1990 | Newcomb et al. |
| 4,979,746 | A | 12/1990 | Gentiluomo |
| 4,984,804 | A | 1/1991 | Yamada et al. |
| 7,160,210 | B2 * | 1/2007 | Melanson et al. ........... 473/378 |
| 7,244,196 | B2 * | 7/2007 | Kennedy et al. ............ 473/378 |
| 2004/0229995 | A1 * | 11/2004 | Wu et al. .................... 524/590 |

* cited by examiner

GOLF BALL WHICH INCLUDES FAST-CHEMICAL-REACTION-PRODUCED COMPONENT AND METHOD OF MAKING SAME

CROSS REFERENCE TO RELATED APPLICATIONS

This application is a continuation application of U.S. patent application Ser. No. 11/475,788, filed on Jun. 27, 2006, which is a continuation of U.S. patent application Ser. No. 10/905,913, filed on Jan. 26, 2005, now U.S. Pat. No. 7,244, 196.

STATEMENT REGARDING FEDERALLY SPONSORED RESEARCH OR DEVELOPMENT

Not Applicable

BACKGROUND OF THE INVENTION

1. Field of the Invention

The invention relates generally to golf balls, and more particularly to golf balls that contain a fast-chemical-reaction-produced component, such as a core and/or cover layer.

2. Description of the Related Art

Golf balls comprise, in general, three types. The first type is a multi-piece wound ball wherein a vulcanized rubber thread is wound under tension around a solid or semi-solid core, and thereafter enclosed in a single or multi-layer covering of a tough, protective material. A second type of a golf ball is a one-piece ball formed from a solid mass of resilient material that has been cured to develop the necessary degree of hardness to provide utility. One-piece molded balls do not have a second enclosing cover. A third type of ball is a multi-piece non-wound ball which includes a liquid, gel or solid core of one or more layers and a cover having one or more layers formed over the core.

Conventional golf ball covers have been made of ionomer, balata, and slow-reacting, thermoset polyurethane. When polyurethane covers are made by conventional methods, such as by casting, a substantial amount of time and energy are required, thus resulting in relatively high cost.

It would be useful to develop a golf ball containing a fast-chemical-reaction-produced component, such as at least one core or cover layer, particularly one which contains polyurethane, polyurea, epoxy and/or unsaturated polyester, and which has excellent light stability and physical properties.

BRIEF SUMMARY OF THE INVENTION

An object of the invention is to produce a golf ball having a polyurethane cover which is formed by a fast chemical reaction. The golf ball cover comprises a light stable, aliphatic-based polyurethane component which is formed by reaction injection molding. The golf ball has physical properties, such as scuff and cut resistance, that are comparable to aromatic-based polyurethane covers.

Yet another object of the invention is to provide a method of making a golf ball of the type described above.

A preferred form of the invention is a multi-piece golf ball having a cover layer comprising a reaction injection molded material comprising polyurethane/polyurea. The reaction injection molded material is preferably an aliphatic-based material. The golf ball cover preferably has a Shore B hardness in the range of from about 20 to about 95, more preferably from about 30 to about 75, and a flex modulus in the range of 1 to about 310 kpsi, and more preferably from about 5 to about 100 kpsi. The golf ball has improved scuff and cut resistance and superior light fastness and weathering over golf ball covers comprising aromatic based polyurethane/polyurea materials.

Another preferred form of the invention is a process for producing a golf ball including the step of reaction injection molding a polyurethane/polyurea material to form a cover layer of the ball.

Yet another preferred form of the invention is a process for producing a golf ball comprising (a) forming a core, (b) covering the core, and (c) coating and adding indicia to the covered ball, wherein step (b) comprises reaction injection molding of a polyurethane and/or polyurea material.

The golf ball of the invention can include, in the cover, optical brighteners, white pigment, UV stabilizers, antioxidants, etc. The cover and/or core may further include fillers such as $TiO_2$, glass, metal, and other fillers described below. Other objects of the invention will become apparent from the specification, drawings and claims.

DETAILED DESCRIPTION OF THE INVENTION

Figure 1:
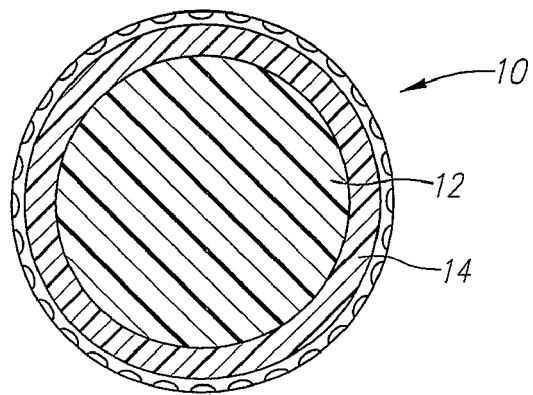
FIG. 1 is a first embodiment of a golf ball having a cover formed according to a reaction injection molded (RIM) process according to the invention.

The present invention is a golf ball in which a cover layer is a fast-chemical-reaction-produced component. This component comprises at least one material selected from the group consisting of polyurethane, polyurea, polyurethane ionomer, epoxy, and unsaturated polyesters, and preferably comprises polyurethane. Preferably, the polyurethane is an aliphatic-based polyurethane. The invention also includes a method of producing a golf ball which contains a fast-chemical-reaction-produced component. A golf ball cover layer formed according to the invention preferably has a flex modulus in the range of from about 1 to about 310 kpsi, a Shore B hardness in the range of from about 20 to about 95, and good light fastness and weathering, good scuff resistance and good cut resistance. As used herein, "polyurethane and/or polyurea" is expressed as "polyurethane/polyurea". Reaction injection molding covers for golf balls offers numerous advantages over conventional slow-reactive processes for producing golf ball covers. The RIM process produces molded covers in a mold release or demold time of 10 minutes or less, preferably 2 minutes or less, and most preferably in 1 minute or less. The RIM process also results in the formation of a reaction product, formed by mixing two or more reactants together, that exhibits a reaction time of about 2 minutes or less, preferably 1 minute or less, more preferably 30 seconds or less, and most preferably about 15 seconds or less. An excellent finish can also be produced on the ball.

The term "demold time" generally refers to the mold release time, which is the time span from the mixing of the components until the earliest possible time at which the part may be removed from the mold. At that time of removal, the part is said to exhibit sufficient "green strength". The term "reaction time" generally refers to the setting time or curing time, which is the time span from the beginning of mixing until the time at which the product no longer flows. Further description of the terms setting time and mold release time are provided in the "Polyurethane Handbook," edited by Günter Oertel, Second Edition, ISBN 1-56990-157-0, herein incorporated by reference.

The RIM process is particularly effective when recycled polyurethane or other polymer resin, or materials derived by recycling polyurethane or other polymer resin, are incorporated into the product. The process may include the step of recycling at least a portion of the reaction product, preferably by glycolysis. From about 5% to about 100% of the polyurethane/polyurea formed from the reactants used to form particular components can be obtained from recycled polyurethane/polyurea.

As indicated above, the fast-chemical-reaction-produced component is preferably a cover layer of the ball, although other layers, such as a mantle layer, a core layer, and/or a core can also be produced. When a polyurethane cover is formed according to the invention, and is then covered with a polyurethane topcoat, excellent adhesion can be obtained. The adhesion in this case is better than adhesion of a polyurethane coating to an ionomeric cover. This improved adhesion can result in the use of a thinner top coat, the elimination of a primer coat, and the use of a greater variety of golf ball printing inks beneath the top coat. These include but are not limited to typical inks such as one component polyurethane inks and two component polyurethane inks.

The preferred method of forming a fast-chemical-reaction-produced component for a golf ball according to the invention is by reaction injection molding (RIM). RIM is a process by which highly reactive liquids are injected into a closed mold, mixed usually by impingement and/or mechanical mixing in an in-line device such as a "peanut mixer", where they polymerize primarily in the mold to form a coherent, one-piece molded article. The RIM processes usually involve a rapid reaction between one or more reactive components such as polyether—or polyester—polyol, polyamine, or other material with an active hydrogen, and one or more isocyanate—containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure (for example, at about 1500 to about 3000 psi). The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

RIM differs from non-reaction injection molding in a number of ways. The main distinction is that in RIM a chemical reaction takes place in the mold to transform a monomer or adducts to polymers and the components are in liquid form. Thus, a RIM mold need not be made to withstand the pressures which occur in a conventional injection molding. In contrast, injection molding is conducted at high molding pressures in the mold cavity by melting a solid resin and conveying it into a mold, with the molten resin often being at about 150 to about 350° C. At this elevated temperature, the viscosity of the molten resin usually is in the range of about 50,000 to about 1,000,000 centipoise, and is typically around 200,000 centipoise. In an injection molding process, the solidification of the resins occurs after about 10-90 seconds, depending upon the size of the molded product, the temperature and heat transfer conditions, and the hardness of the injection molded material. Subsequently, the molded product is removed from the mold. There is no significant chemical reaction taking place in an injection molding process when the thermoplastic resin is introduced into the mold. In contrast, in a RIM process, the chemical reaction typically takes place in less than about two minutes, preferably in under one minute, and in many cases in about 30 seconds or less.

If plastic products are produced by combining components that are preformed to some extent, subsequent failure can occur at a location on the cover which is along the seam or parting line of the mold. Failure can occur at this location because this interfacial region is intrinsically different from the remainder of the cover layer and can be weaker or more stressed. The present invention is believed to provide for improved durability of a golf ball cover layer by providing a uniform or "seamless" cover in which the properties of the cover material in the region along the parting line are generally the same as the properties of the cover material at other locations on the cover, including at the poles. The improvement in durability is believed to be a result of the fact that the reaction mixture is distributed uniformly into a closed mold. This uniform distribution of the injected materials significantly reduces and/or eliminates knit-lines and other molding deficiencies which can be caused by temperature difference and/or reaction difference in the injected materials. The process of the invention results in generally uniform molecular structure, density and stress distribution as compared to conventional injection-molding processes.

The fast-chemical-reaction-produced component preferably has a flex modulus of from about 1 to about 310 kpsi, more preferably from about 5 to about 100 kpsi, and even more preferably 5 to about 70 kpsi. The core can be one piece or multi-layer, each layer can be either foamed or unfoamed, and density adjusting fillers, including metals, can be used. The cover of the ball can be harder or softer than any particular core layer, mantle layer or inner cover layer.

The fast-chemical-reaction-produced component can incorporate suitable additives and/or fillers as known in the golf ball art. In an outer cover layer, pigments or dyes, accelerators and UV stabilizers can be added. Furthermore, compatible polymeric materials can be added. For example, when the component comprises polyurethane and/or polyurea, such polymeric materials include polyurethane ionomers, polyamides, and the like.

A golf ball outer cover layer formed from a fast-chemical-reaction-produced material according to the present invention typically contains 0 to about 20 weight percent of filler material, more preferably from about 1 to about 10 weight percent, and most preferably from about 1 to about 5 weight percent.

Catalysts can be added to the RIM polyurethane system starting materials as long as the catalysts generally do not react with the constituent with which they are combined. Suitable catalysts include those that are known to be useful with polyurethanes and polyureas. Examples of catalysts are those well known in the art of polyurethanes, such as tin, zinc and zirconium catalysts, as well as amine catalysts. The tin, zinc or zirconium catalyst preferably comprises at least one member selected from the group consisting of a zirconium complex, dibutyl tin dilaurate, dibutyl acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate. Examples of amine catalysts include, but are not limited to, N,N,N'-trimethyl-N-hydroxyethyl-bisaminoethyl ether; N,N-bis(3-dimethylaminopropyl)-N-isopropanol amine; N-(3-dimethylaminopropyl)-N,N-diisopropanolamine; N,N-dimethylethanolamine; and 2-(2-dimethylaminoethoxy)ethanol. The quantity of catalyst will depend upon the type of catalyst, polyol, and polyisocyanate used, as well as the curing temperature and desired curing time and other factors. Generally, the amount of catalyst used is from about 0.005 to 0.5 weight percent. Two or more different catalysts may also be used if desired.

The reaction mixture viscosity should be sufficiently low to ensure that the empty space in the mold is completely filled. The reactant materials generally are preheated to about 80 to 200° F. before they are mixed. In most cases it is necessary to preheat the mold, for example, to about 80 to 200° F., to ensure proper injection viscosity.

As indicated above, one or more cover layers of a golf ball can be formed from a fast-chemical-reaction-produced material according to the present invention.

Referring now to the drawings, and first to FIG. 1, a golf ball having a cover comprising a RIM polyurethane is shown. The golf ball 10 includes a core 12 and a polyurethane cover 14 formed by RIM.

Figure 2:
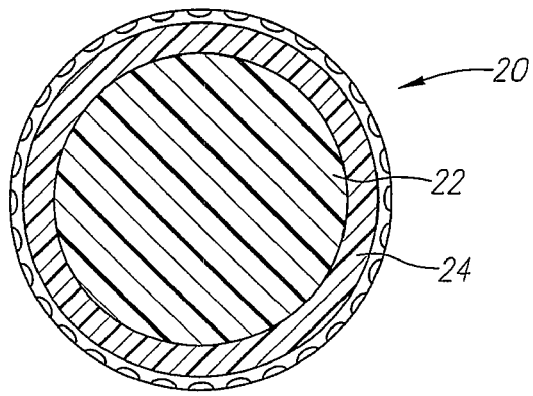
FIG. 2 is a second embodiment of a golf ball formed according to a reaction injection molded (RIM) process according to the invention.

Referring now to FIG. 2, a golf ball having a core comprising a RIM polyurethane is shown. The golf ball 20 has a RIM polyurethane core 22, and a RIM polyurethane cover 24.

Figure 3:
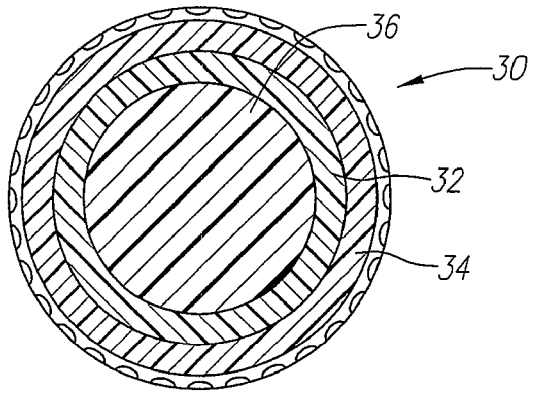
FIG. 3 is a third embodiment of a golf ball formed according to a reaction injection molded (RIM) process according to the invention.

Referring to FIG. 3, a multi-layer golf ball 30 is shown with a core 32, a mantle cover layer, and an outer cover layer comprising a RIM polyurethane material. The core and/or mantle layer may comprise RIM polyurethane or any other material known in the golf ball art.

Figure 4:
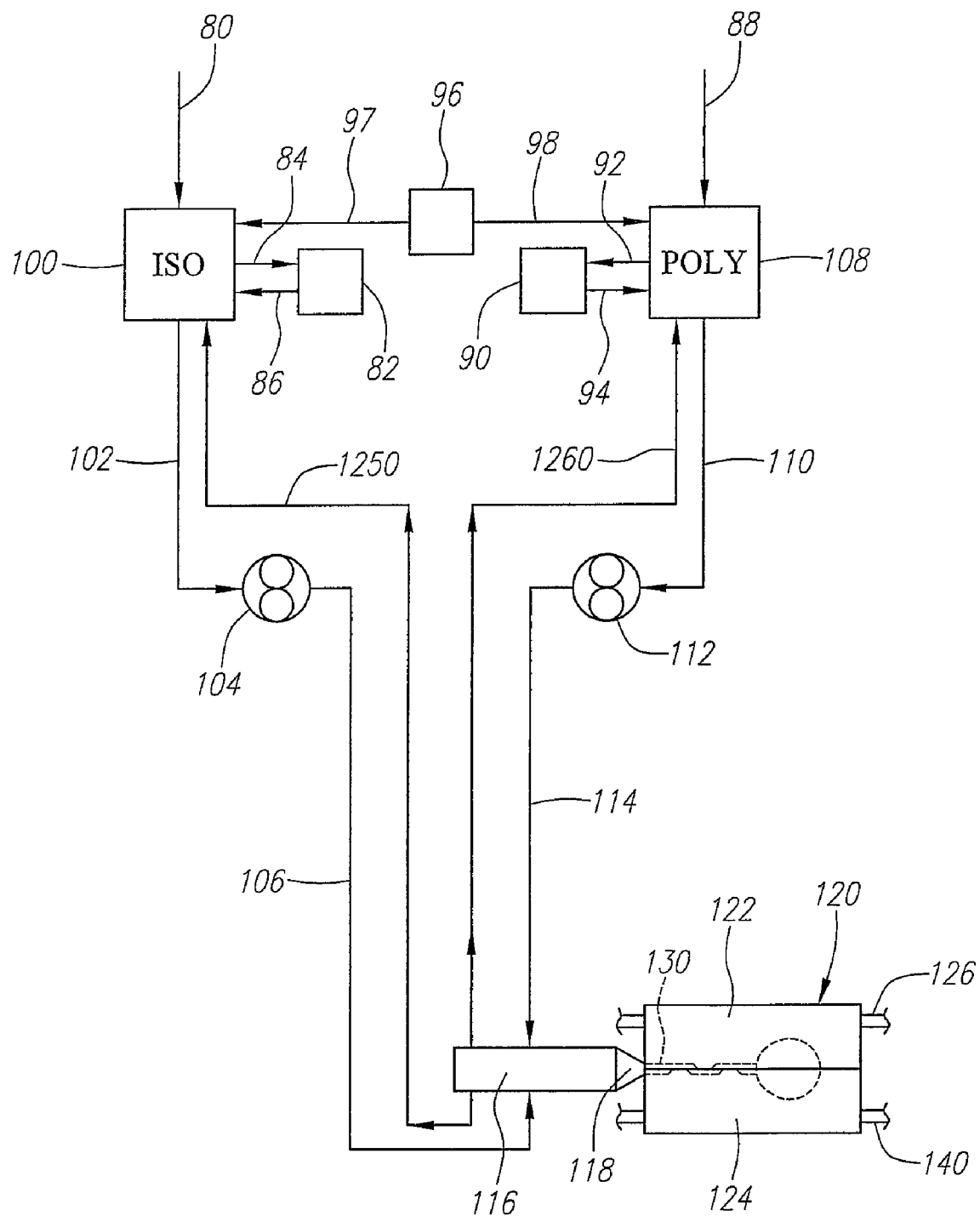
FIG. 4 is a process flow diagram which schematically depicts a reaction injection molding process according to the invention.

Referring next to FIG. 4, a process flow diagram for forming a RIM cover of polyurethane is shown. Isocyanate from bulk storage is fed through line 80 to an isocyanate tank 100. The isocyanate is heated to the desired temperature, for example, to about 80 to about 200° F., by circulating it through heat exchanger 82 via lines 84 and 86. Polyol, polyamine, or another compound with an active hydrogen atom is conveyed from bulk storage to a polyol tank 108 via line 88. The polyol is heated to the desired temperature, for example, to about 80 to about 200° F., by circulating it through heat exchanger 90 via lines 92 and 94. Dry nitrogen gas is fed from nitrogen tank 96 to isocyanate tank 100 via line 97 and to polyol tank 108 via line 98. Isocyanate is fed from isocyanate tank 100 via line 102 through a metering cylinder or metering pump 104 into recirculation mix head inlet line 106. Polyol is fed from polyol tank 108 via line 110 through a metering cylinder or metering pump 112 into a recirculation mix head inlet line 114. The recirculation mix head 116 receives isocyanate and polyol, mixes them, and provides for them to be fed through nozzle 118 into injection mold 120. The injection mold 120 has a top mold 122 and a bottom mold 124. Coolant flows through cooling lines 126 in the top mold 122 and lines 128 in the bottom mold 124. The materials are kept under controlled temperature conditions to insure that the desired reaction profile is maintained.

The polyol component typically contains additives, such as stabilizers, flow modifiers, catalysts, combustion modifiers, blowing agents, fillers, pigments, optical brighteners, and release agents to modify physical characteristics of the cover. Recycled polyurethane/polyurea also can be added to the core. Polyurethane/polyurea constituent molecules that were derived from recycled polyurethane can be added in the polyol component.

Inside the mix head, injector nozzles impinge the isocyanate and polyol at ultra-high velocity to provide excellent mixing. Additional mixing preferably is conducted using an aftermixer 130, which typically is constructed inside the mold between the mix head and the mold cavity.

Figure 5:
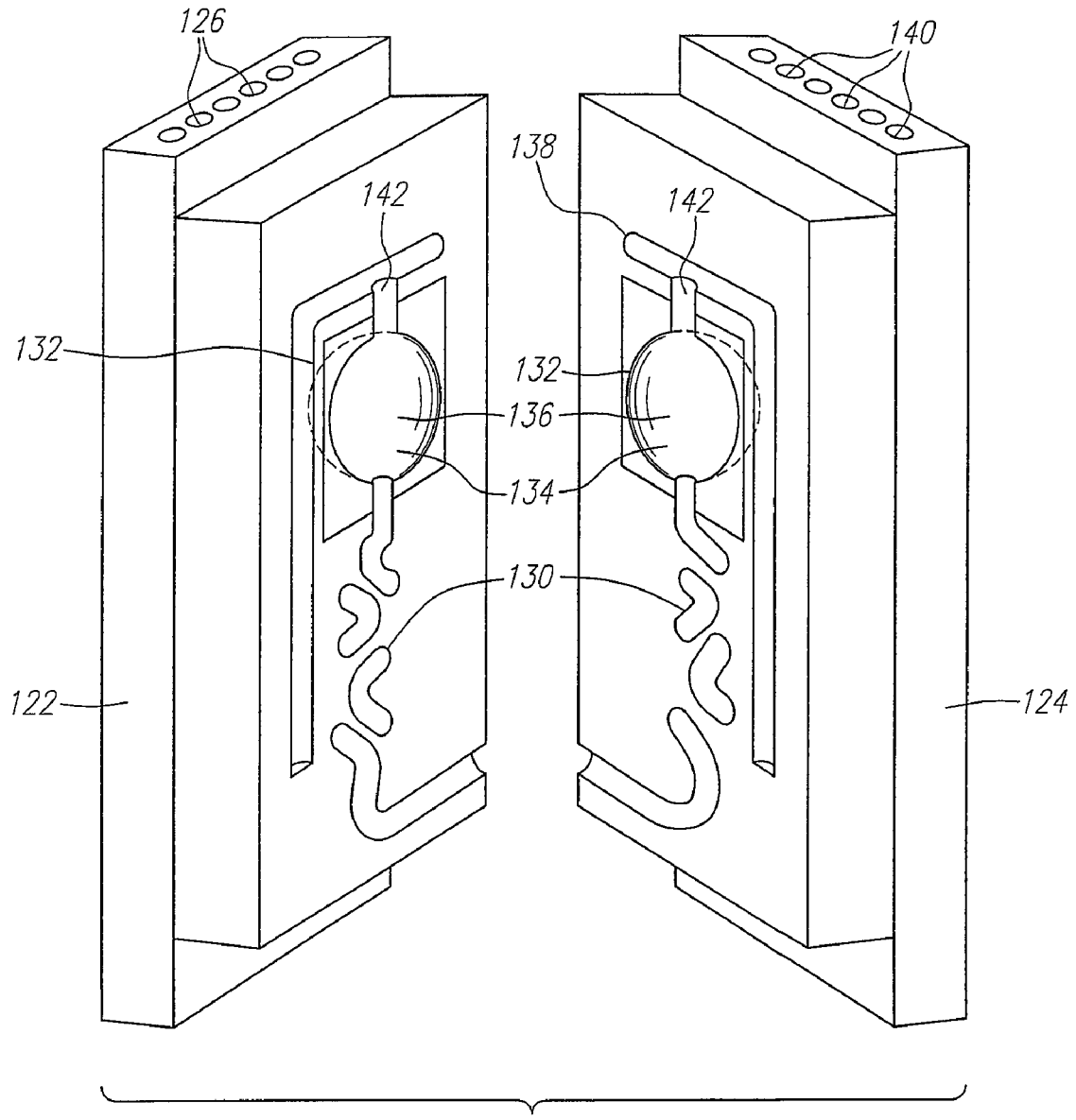
FIG. 5 schematically shows a mold for reaction injection molding a golf ball cover according to the invention.

As is shown in FIG. 5, the mold includes a golf ball cavity chamber 132 in which a spherical golf ball mold 134 with a dimpled, spherical mold cavity 136 is positioned. The aftermixer 130 can be a peanut aftermixer, as is shown in FIG. 5, or in some cases another suitable type, such as a heart, harp or dipper. An overflow channel 138 receives overflow material from the golf ball mold 134 through a shallow vent 136. Cooling water passages 138, which preferably are in a parallel flow arrangement, carry cooling water through the top mold 122 and the bottom mold 124.

The mold cavity contains retractable pins and is generally constructed in the same manner as a mold cavity used to injection mold a thermoplastic, e.g., ionomeric golf ball cover. However, a few differences when RIM is used are that tighter pin tolerances generally are required, a lower mold temperature is used, and a lower injection pressure is used. Also, the molds can be produced from lower strength material such as aluminum. The golf balls formed according to the present invention can be coated using a conventional two-component spray coating or can be coated during the RIM process, for example, by using an in-mold coating process.

One of the significant advantages of the RIM process according to the invention is that polyurethane or other cover material can be recycled and used in golf ball cores. Recycling can be conducted by, for example, glycolysis. Typically, about 10 to 80% of the material which is injection molded actually becomes part of the cover. The remaining 20 to 90% is recycled.

Recycling of polyurethanes by glycolysis is known from, for example, RIM Part and Mold Design—Polyurethanes, 1995, Bayer Corp., Pittsburgh, Pa. Another significant advantage of the present invention is that because reaction injection molding occurs at low temperatures and pressures (for example, about 80 to about 200° F. and about 100 to 200 psi), this process is particularly beneficial when a cover is to be molded over a very soft core. When higher pressures are used for molding over soft cores, the cores "shut off" or deform and impede the flow of material causing uneven distribution of cover material.

Polyisocyanates represent the key substances in forming polyurethane/polyurea. The general structure of polyisocyanates is R—(NCO)$_n$, where n is at least two, and R is an aromatic or an aliphatic group. The isocyanate groups (—N=C=O) that react with hydroxyl groups form a polyurethane, whereas isocyanate groups that react with an amine group form a polyurea. In the present invention, the isocyanate groups (i.e., the "iso" side) may react with the hydroxyl group, the amine group, or both (i.e., the "polyol" side), in order to form polyurethane/polyurea.

In a preferred embodiment, the polyurethane component which of the present invention incorporates an aliphatic isocyanate or isocyanate prepolymer. Aliphatic isocyanates include, but are not limited to, hexamethylene diisocyanate (HDI); Methylene Dicyclohexyl Diisocyanate (H$_{12}$MDI); isophorone diisocyanate (IPDI); tetramethylene diisocyanate; octamethylene diisocyanate; decamethylene diisocyanate; dodecamethylene diisocyanate; tetradecamethylene diisocyanate; derivatives of lysine diisocyanate (LDI); tetramethylxylylene diisocyanate; trimethylhexane diisocyanate (TMDI) or tetramethylhexane diisocyanate; cycloaliphatic diisocyanates such as 1,4-, 1,3- or 1,2-diisocyanatocyclohexane; 4,4-di(isocyanatocyclohexyl)methane; 1-isocyanato-3,3,5-trimethyl-5-(isocyanatomethyl)cyclohexane-(isophorone diisocyanate); 1,5-naphthalenediisocyanate (NDI) or 2,4- or 2,6-diisocyanator-1-methylcyclohexane. Aliphatic isocyanates generally exhibit good light fastness and UV stability, but are slower to react and produce softer polymers than the aromatic isocyanates. Polyurethanes based on an aliphatic diisocyanate can provide improved gloss retention UV light stability, thermal stability hydrolytic stability. Additionally, TMXDI (META) aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions. IPDI is preferred in some cases due to its good impact resistance.

The polyol component is preferably a polyester or polyether based prepolymer. Examples of polyester and polyether based prepolymers include, but are not limited to, PTMEG; PPG; PEG; and the like. A preferred polyol is PTMEG, but the polyol choice depends on the desired final properties, such as scuff and cut resistance.

The polyol component typically contains additives, such as stabilizers, flow modifiers, catalysts, combustion modifiers, blowing agents, fillers, pigments, optical brighteners, and release agents to modify physical characteristics of the cover. Polyurethane/polyurea constituent molecules that were derived from recycled polyurethane can be added in the polyol component.

Chain extenders may also be used with polyisocyanates to form polyurethane/polyurea. Chain extenders lengthen the main chain of polyurethane/polyurea causing end-to-end attachments. Examples of chain extenders for use in forming polyurethane/polyurea include glycol chain extenders and amine chain extenders. Suitable glycol chain extenders include, but are not limited to, ethylene glycol; propylene glycol; butane glycol; pentane glycol; hexane glycol; benzene glycol; xylene glycol; 1,4-butane diol; 1,3-butane diol; 2,3-dimethyl-2,3-butane diol; and dipropylene glycol. Suitable amine chain extenders include, but are not limited to, tetramethyl-ethylenediamine; dimethylbenzylamine; diethylbenzylamine; pentamethyldiethylenetriamine; dimethyl cyclohexylamine; tetramethyl-1,3-butanediamine; 1,2-dimethylimidazole; bis-(dimethylaminoethylether); 2-methylimidazole; and pentamethyldipropylenetriamine.

Golf ball cores also can be made using the materials and processes of the invention. To make a golf ball core using RIM polyurethane, the same processing conditions are used as are described above with respect to covers. One difference is, of course, that no retractor pins are needed in the mold. Furthermore, an undimpled, smaller mold is used. If, however, a one piece ball is desired, a dimpled mold would be used. Polyurethanes also can be used for cores.

Golf balls typically have indicia and/or logos stamped or formed thereon. Such indicia can be applied by printing using a material or a source of energetic particles after the ball core and/or cover have been reaction-injection-molded according to the present invention. Printed indicia can be formed form a material such as ink, foil (for use in foil transfer), etc. Indicia printed using a source of energetic particles or radiation can be applied by burning with a laser, burning with heat, directed electrons, or light, phototransformations of, e.g., UV ink, impingement by particles, impingement by electromagnetic radiation etc. Furthermore, the indicia can be applied in the same manner as an in-mold coating, for example, by applying to the indicia to the surface of the mold prior to molding of the cover.

Additional materials may also be added to the inner and outer cover layer of the present invention as long as they do not substantially reduce the playability properties of the ball. Such materials include dyes and/or optical brighteners (for example, Ultramarine Blue™ sold by Whittaker, Clark, and Daniels of South Plainsfield, N.J.) (see U.S. Pat. No. 4,679,795); pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, and the like, and reinforcing materials such as glass fibers and inorganic fillers, as long as the desired properties produced by the golf ball covers of the invention are not impaired. The polyurethane which is selected for use as a golf ball cover preferably has a Shore B hardness of 20 to 95, and more preferably 30 to 75. The polyurethane which is to be used for a cover layer preferably has a flex modulus of from about 1 to about 310 kpsi, and more preferably from about 5 to about 100 kpsi.

Non-limiting examples of suitable RIM systems for use in the present invention are Bayflex® elastomeric polyurethane RIM systems, Baydur® GS solid polyurethane RIM systems, Prism® (solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and Elastolit SR systems from BASF (Parsippany, N.J.), and VIBRARIM systems from Crompton Uniroyal Corporation (Middlebury, Conn.). Further preferred examples are polyols, polyamines and isocyanates formed by processes for recycling polyurethanes and polyureas. Peroxides, such as MEK-peroxide and dicumyl peroxide can be used. Furthermore, catalysts or activators such as cobalt octoate 6%, dibutyl tin dilaurate, and the like, can be used.

The polyurethane prepolymer is preferably a polytetramethylene ether glycol terminated 4,4'-diphenylmethane diisocyanate-based polyurethane prepolymers. Preferred polytetramethylene ether glycol terminated 4,4'-diphenylmethane diisocyanate-based polyurethane prepolymers are available from Uniroyal Chemical Company of Middlebury, Conn., under the tradename VIBRATHANE®, and include VIBRATHANE® B836, VIBRATHANE® B670, VIBRATHANE®B625. An alternative polyurethane prepolymer is an ester terminated 4,4'-diphenylmethane diisocyanate-based polyurethane prepolymers such as VIBRATHANE® 8520, VIBRATHANE® 8007, VIBRATHANE® 8010 and VIBRATHANE® 6012.

The ratio of the polyurethane prepolymer to curative is determined by the nitrogen-carbon-oxygen group ("NCO") content of the polyurethane prepolymer. For example, the NCO group content of the polytetramethylene ether glycol terminated 4,4'-diphenylmethane diisocyanate-based polyurethane prepolymer is preferably in the range of 12.0% to 18.0%, more preferably in the range of 14.0% to 16.5%, and most preferably 16.0%. The NCO content of the ester terminated 4,4'-diphenylmethane diisocyanate-based polyurethane prepolymer is preferably range of 12.0% to 18.0%, more preferably in the range of 14.0% to 16.5%, and most preferably 16.0%.

The core 32 of the golf ball 30 is preferably a single solid core such as disclosed in U.S. Pat. No. 6,612,940, assigned to Callaway Golf Company and which pertinent parts are hereby incorporated by reference, or such as disclosed in U.S. Pat. No. 6,465,546, also assigned to Callaway Golf Company and which pertinent parts are hereby incorporated by reference. However, alternative embodiments have a non-solid or multiple cores such as disclosed in U.S. Pat. No. 6,663,509, which pertinent parts are hereby incorporated by reference. In a preferred embodiment, the finished core 12 has a diameter of about 1.35 to about 1.64 inches for a golf ball 10 having an outer diameter of 1.68 inches. The core weight is preferably maintained in the range of about 32 to about 40 g. The core PGA compression is preferably maintained in the range of about 50 to 90, and most preferably about 55 to 80.

As used herein, the term "PGA compression" is defined as follows:

PGA compression value=180−Riehle compression value

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85.

A boundary layer 34 is preferably composed of a thermoplastic material. Suitable thermoplastic materials for the boundary layer 34 include: HYTREL® and/or HYLENE® products from DuPont, Wilmington, Del.; PEBAX® products from Elf Atochem, Philadelphia, Pa.; SURLYN® products from DuPont; and/or ESCOR® or IOTEK® products from Exxon Chemical, Houston, Tex.

In a preferred embodiment of the golf ball 30, the boundary layer 34 comprises a high acid (i.e. greater than 16 weight percent acid) ionomer resin or a blend of one or more high acid ionomers and one or more low acid ionomers (i.e. 16 weight percent acid or less)

The boundary layer 34 compositions of the embodiments described herein may include the high acid ionomers such as those developed by E. I. DuPont de Nemours & Company under the SURLYN brand, and by Exxon Corporation under the ESCOR or IOTEK brands, or blends thereof. Examples of compositions which may be used as the boundary layer 34 herein are set forth in detail in U.S. Pat. No. 5,688,869, which is incorporated herein by reference. The boundary layer 34 high acid ionomer compositions are not limited in any way to those compositions set forth in said patent. Those compositions are incorporated herein by way of examples only.

The high acid ionomers which may be suitable for use in formulating the boundary layer 34 compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10-100%, preferably 30-70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce boundary layer 34 compositions exhibiting enhanced hardness and resilience due to synergies which occur during processing. Consequently, these metal cation neutralized high acid ionomer resins can be blended to produce substantially higher C.O.R.'s than those produced by the low acid ionomer boundary layer 34 compositions presently commercially available. More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the boundary layer 34 of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The boundary layer 34 compositions may include the low acid ionomers such as those developed and sold by E. I. DuPont de Nemours & Company under the SURLYN and by Exxon Corporation under the brands ESCOR and IOTEK, ionomers made in-situ, or blends thereof.

Another embodiment of the boundary layer 34 comprises a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which preferably have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the brand HYTREL, or thermoplastic block polyamides, for example, a polyether amide such as that marketed by Elf Atochem S. A. under the brand PEBEX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

The Shore D hardness of the boundary layer 34 preferably ranges from 40 to 75, as measured according to ASTM D-2290. In a most preferred embodiment, the boundary layer 34 has a Shore D hardness in the range of 50-65. One reason for preferring a boundary layer 34 with a Shore D hardness of 75 or lower is to improve the feel of the resultant golf ball. It is also preferred that the boundary layer 34 is composed of a blend of SURLYN® ionomer resins. One preferred formulation for the boundary layer 34 has 25-50 weight percent SURLYN 8150, 25-50 weight percent SURLYN 9150, and 25-50 weight percent SURLYN 6320. Another formulation for the boundary layer 14 has 25-75 weight percent SURLYN 9150, and 25-75 weight percent SURLYN 6320. Those skilled in the pertinent art will recognize that other ionomers may be utilized for the optional boundary layer 34 without departing from the scope and spirit of the present invention. The Shore D hardness of the boundary layer 34 is preferably 50 to 75, more preferably from 55-65 Shore D, and most preferably 58-63 Shore D, as measured according to ASTM-D2240.

The polyurethane material of the present invention preferably has a Shore D hardness ranging from 30 to 60 as measured according to ASTM-D2240, more preferably 40 to 55 Shore D, and most preferably 50 Shore D.

As shown in FIG. 3, the preferred construction of a golf ball 30 utilizing the fast-chemical reaction produced material of the present invention is a three-piece solid golf ball having a solid polybutadiene core 32, a boundary layer 34 composed of a blend of ionomers, and a cover 36 composed of the polyurethane material of the present invention. The core 32 is preferably compression molded, the boundary layer 34 is preferably injection molded, and the cover 16 is reaction injection molded. The golf ball 30 may be finished with one or two layers of a base white coating, a clear coating and an indicia.

The thickness of the cover 36 preferably ranges from 0.010 inch to 0.070 inch, more preferably ranges from 0.014 inch to 0.050 inch, even preferably ranges from 0.015 inch to 0.044 inch, most preferably ranges from 0.020 inch to 0.030 inch, and is most preferably 0.025 inch. The boundary layer 34 is preferably injection molded and preferably ranges in thickness from 0.040 inch to 0.090 inch, more preferably from 0.045 inch to 0.070 inch, and most preferably from 0.050 inch to 0.060 inch. The boundary layer 34 may also be compression molded from half shells. The core 32 preferably has a diameter of between 1.35 inches and 1.60 inches, more preferably between 1.45 inches and 1.55 inches, and most preferably 1.49 inches. The core 32 preferably has a PGA compression ranging from 70-110 points, and most preferably 100 points. A more detailed description of a construction and performance properties of a golf ball utilizing the polyurethane material of the present invention is set forth in U.S. Pat. No. 6,443,858, for a Golf Ball With A High Coefficient Of Restitution, issued on Sep. 2, 2002, assigned to Callaway Golf Company, and U.S. Pat. No. 6,478,697 for a Golf Ball With A High Coefficient Of Restitution, filed on Nov. 12, 2002, assigned to Callaway Golf Company, both of which are hereby incorporated by reference in their entireties.

The Shore D hardness of each of the golf balls 10, 20 and 30, as measured on the golf ball, is preferably between 30 Shore D points to 75 Shore D points, and most preferably between 50 Shore D points and 65 Shore D points. The hardness is measured using an Instron Shore D Hardness measurement device wherein the golf ball is placed within a holder and the pin is lowered to the surface to measure the hardness. The average of five measurements is used in calculating the ball hardness. The ball hardness is preferably measured on a land area of the cover 14, 24 and 36. The preferred overall diameter of the golf ball 10, 20 or 30 is approximately 1.68 inches, and the preferred mass is approximately 45.5 grams. However, those skilled in the pertinent art will recognize that the diameter of the golf ball 10, 20 or 30 may be smaller (e.g. 1.65 inches) or larger (e.g. 1.70 inches) without departing from the scope and spirit of the present invention. Further, the mass may also vary without departing from the scope and spirit of the present invention.

The surface geometry of each of the golf balls 10, 20 and 30 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of each of the golf balls 10, 20 and 30 may have a non-dimple pattern such as disclosed in U.S. Pat. No.

6,290,615 filed on Nov. 18, 1999 for A Golf Ball Having Tubular lattice Pattern, which pertinent parts are hereby incorporated by reference.

EXAMPLES

The following examples are included for purposes of illustration and are not intended to be limiting.

Example 1

Golf balls having cores and covers were produced using various aliphatic and aromatic polyurethane RIM systems. The aliphatic RIM systems comprised an aliphatic polyol and an $H_{12}$MDI/PTMEG prepolymer. The aromatic systems comprised MDI/PTMEG-based prepolymers and PTMEG/MOCA curatives. (Note: MOCA is 4,4'-methylene-bis-(ortho-chloroaniline, a curing agent for polyurethane elastomers.) The balls were tested to measure light stability, cut, scuff and Shore C and Shore D hardness. Two controls, a Strata Tour Ultimate and a Titleist ProV1 were also measured. The results follow in Table 2.

TABLE 1

| Type | Scuff | Cut | Oven | Shore C, D | Weather Test |
|---|---|---|---|---|---|
| Aromatic System | | | | | |
| Control Aromatic | 1.6 | 2 | Above Ave. | 46, 34 | Fail |
| Harder | 1.8 | 2 | Above Ave. | 40, 29 | Fail |
| Harder, more resilient | 1.7 | 2 | Above Ave. | 40, 28 | Fail |
| Aliphatic System | | | | | |
| Control Aliphatic | 1.8 | 2 | Above Ave. | 52, 34 | Pass |
| Harder | 2.0 | 2 | Above Ave. | 50, 33 | Pass |
| Harder, more resilient | 2.0 | 2 | Above Ave. | 61, 39 | Pass |

| | | Controls | | |
|---|---|---|---|---|
| Type | Scuff | Cut | Oven | Weather Test |
| Tour Ultimate | 3.0 | 3 | Good | Pass |
| ProV1 | 2.0 | 1 | Excellent | Pass |

Table 1 shows that golf ball covers made with aliphatic RIM systems have properties similar to those of aromatic RIM systems as well as thermoplastic polyurethanes and cast polyurethanes, as exhibited by the commercially available samples. The aliphatic RIM covers passed the weather test as well.

Example 2

Additional two-piece and three-piece golf balls having were produced using various aliphatic and aromatic polyurethane RIM systems. The aliphatic RIM systems comprised an aliphatic polyol and an $H_{12}$MDI/PTMEG prepolymer. The aromatic systems comprised MDI/MEG-based prepolymers and PTMEG/MOCA curatives. The balls were tested to measure light stability, cut, scuff and Shore C hardness. Two controls, a Strata Tour Ultimate and a Titleist ProV1 were also measured. The results follow in Table 3.

TABLE 2

| Type | Scuff | Cut | Oven | Shore C | Weather Test |
|---|---|---|---|---|---|
| Aromatic System | | | | | |
| 3 piece | 2.5 | 2 | Good | 72 | Fail |
| 3 piece | 3.0 | 1 | Good | 64 | Fail |
| 3 piece | 3.3 | 1 | Good | 75 | Fail |
| Aliphatic System | | | | | |
| 2 piece | 1.7 | 1 | Exc. | 67 | Pass |
| 3 piece | 1.7 | 2 | Exc. | 69 | Pass |
| 3 piece | 2.0 | 2 | Exc. | 75 | Pass |
| 3 piece | 2.3 | 1 | Exc. | 69 | Pass |

| | | Controls | | |
|---|---|---|---|---|
| Type | Scuff | Cut | Oven | Weather Test |
| Tour Ultimate | 3.0 | 3 | Good | Pass |
| ProV1 | 3.1 | 2 | Excellent | Pass |
| RIM | 3.1 | 2 | Excellent | Pass |

The above results in Table 2 also show that the golf balls having a RIM polyurethane cover formed from an aliphatic based polyurethane/polyurea exhibited scuff and cut results as good as commercially available golf balls and aromatic based polyurethane/polyurea covered golf balls. Additionally, the golf balls of the invention having aliphatic based polyurethane/polyurea covers exhibited better light stability as exhibited by the weather test.

DEFINITIONS

Fillers

In a particularly preferred form of the invention, at least one layer of the golf ball contains at least one part by weight of a filler. Fillers preferably are used to adjust the density, flex modulus, mold release, and/or melt flow index of a layer. More preferably, at least when the filler is for adjustment of density or flex modulus of a layer, it is present in an amount of at least 2 parts by weight based upon 100 parts by weight of the layer composition. With some fillers, up to about 200 parts by weight probably can be used.

A density adjusting filler according to the invention preferably is a filler which has a specific gravity which is at least 0.05 and more preferably at least 0.1 higher or lower than the specific gravity of the layer composition. Particularly preferred density adjusting fillers have specific gravities which are higher than the specific gravity of the resin composition by 0.2 or more, even more preferably by 2.0 or more.

A flex modulus adjusting filler according to the invention is a filler which, when used in an amount of from about 1 to about 100 parts by weight based upon 100 parts by weight of resin composition, will raise or lower the flex modulus (ASTM D-790) of the resin composition by at least 1% and preferably at least 5% as compared to the flex modulus of the resin composition without the inclusion of the flex modulus adjusting filler.

A mold release adjusting filler is a filler which allows for the easier removal of a part from a mold, and eliminates or reduces the need for external release agents which otherwise could be applied to the mold. A mold release adjusting filler typically is used in an amount of up to about 2 weight percent based upon the total weight of the layer.

A melt flow index adjusting filler is a filler which increases or decreases the melt flow, or ease of processing of the composition.

The layers may contain coupling agents that increase adhesion of materials within a particular layer e.g. to couple a filler to a resin composition, or between adjacent layers. Non-limiting examples of coupling agents include titanates, zirconates and silanes. Coupling agents typically are used in amounts of from about 0.1 to about 2 weight percent based upon the total weight of the composition in which the coupling agent is included.

A density adjusting filler is used to control the moment of inertia, and thus the initial spin rate of the ball and spin decay. The addition in one or more layers, and particularly in the outer cover layer of a filler with a lower specific gravity than the resin composition results in a decrease in moment of inertia and a higher initial spin rate than would result if no filler were used. The addition in one or more of the cover layers, and particularly in the outer cover layer of a filler with a higher specific gravity than the resin composition, results in an increase in moment of inertia and a lower initial spin rate. High specific gravity fillers are preferred as less volume is used to achieve the desired inner cover total weight. Nonreinforcing fillers are also preferred as they have minimal effect on COR. Preferably, the filler does not chemically react with the resin composition to a substantial degree, although some reaction may occur when, for example, zinc oxide is used in a shell layer which contains some ionomer.

The density-increasing fillers for use in the invention preferably have a specific gravity in the range of from about 1.0 to about 20. The density-reducing fillers for use in the invention preferably have a specific gravity of from about 0.06 to about 1.4, and more preferably form about 0.06 to about 0.90. The flex modulus increasing fillers have a reinforcing or stiffening effect due to their morphology, their interaction with the resin, or their inherent physical properties. The flex modulus reducing fillers have an opposite effect due to their relatively flexible properties compared to the matrix resin. The melt flow index increasing fillers have a flow enhancing effect due to their relatively high melt flow versus the matrix. The melt flow index decreasing fillers have an opposite effect due to their relatively low melt flow index versus the matrix.

Fillers which may be employed in layers other than the outer cover layer may be or are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. Examples of fillers suitable for use include, but are not limited to, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates, metals, metal alloys, tungsten carbide, metal oxides, metal stearates, particulate carbonaceous materials, micro balloons, and combinations thereof. All of fillers except for metal stearates would be expected to reduce the melt flow index of an injection molded cover layer. The amount of filler employed is primarily a function of weight requirements and distribution.

Scuff Resistance

The scuff resistance test was conducted in the manner described below. The balls that were tested were primed and top coated. A Titleist Vokey 56° Wedge (256·12) was mounted in a mechanical swing machine. The club swing speed used is 70 mph. After each hit, the clubface is brushed clean using a nylon bristled brush. A minimum of three samples of each ball were tested. Each ball was hit three times at three different locations so as not to overlap with other strikes. The details of the club face are critical, and are as follows:

Groove width—0.026 inches
Groove depth—0.014 inches;

For each strike, a point value is assigned based on a scale from 0.0 to 6.0 with 0.0 representing no visible mark from the strike and 6.0 representing shredding of the material, with consideration given to a potential end user's perception of cover damage. After completing all strikes, determine the average point value. This average point value, or rank, can be correlated to the chart below.

Scuff Test Ranking

| Rank | Average Point Value |
|---|---|
| Excellent | 0.0-1.0 |
| Very Good | 1.1-2.0 |
| Good | 2.1-3.0 |
| Fair | 3.1-4.0 |
| Borderline | 4.1-5.0 |
| Poor (unacceptable) | 5.1-6.0 |

Cut Test

The cut test (off center cut) was performed as described below. An off center cut test was used as it more closely represents actual play. The shear component of this blow makes the off-center cut test the most severe and most useful in determining the cut resistance of a cover material.

The cut performance test consists of cutting a minimum of three golf balls at least twice. Each cut is in a different location on the ball so as not to overlap other cuts. Cutting the samples directly on the equator should be avoided. The off-center cut test uses a guillotine to strike the ball with a glancing blow and represents a mishit where the ball might be topped or skulled. To perform the test, adjust the sample holder to the appropriate position and place the golf ball in the sample holder. Carefully lift the guillotine to the top of its stroke, making sure not to hit the release switch on the left of the head. The head should stay at the top by means of its clutch mechanism. Tap the release switch on the left of the head to release the guillotine to strike the ball. Rotate the ball for the next blow(s) making sure the subsequent strike(s) will not overlap. Once all the samples have been cut, each strike is ranked according to the guidelines below. The cut ranking for the sample set is represented by the average of all cuts. An overall ranking of 3 or better is necessary for acceptable field durability.

| DEFECT CHARACTER | CUT RANK |
|---|---|
| No Visible Marks | 0 |
| Barely Visible Lines | 1 |
| Distinct Lines | 2 |
| Lines with few Wrinkles | 3 |
| Wrinkles and Minor Cuts | 4 |
| Deep Cuts or Tearing | 5 |

Weather Test

Golf balls are placed in a weatherometer, such as an Atlas Ci35A, 6500 watt weatherometer, for 36 hours. They are exposed to constant light for the duration of the test. After 36 hours, the golf balls are removed and the covers are checked for light stability. If there is significant color change, the ball fails.

Oven Test

Golf balls were placed in an oven "soak" at about 70C overnight (approximately 16 hours). At the end of the test, the golf balls were removed and visually assessed to determine if the cover "melted" or not. The covers were rated as Excellent, Good, or Poor, depending on how much the cover melted or changed.

We claim as our invention:

1. A golf ball comprising:
   a core; and
   a cover disposed about said core;
wherein said cover comprises a fast reacting aliphatic-based polyurethane and/or polyurea material, wherein said fast reacting aliphatic-based polyurethane and/or polyurea material has a reaction time of less than two minutes at processing conditions, wherein said aliphatic-based polyurethane and/or polyurea material comprises the reaction product of an aliphatic diisocyanate prepolymer comprising methylene dicyclohexyl diisocyanate and polytetramethylene ether glycol, an aliphatic polyol and a catalyst, wherein the fast reacting aliphatic-based polyurethane and/or polyurea material of the cover has a flexural modulus ranging from 5 to 100 kpsi, wherein the golf ball has a Shore C hardness of 75.

2. A golf ball comprising:
   a core; and
   a cover formed over the core, the cover composed of a fast chemical reaction material formed from reactants comprising a prepolymer comprising 1,6, hexamethylene-diisocyanate and a polytetramethylene ether glycol, and an aliphatic polyol;
   wherein the cover has a thickness ranging from 0.010 inch to 0.044 inch, wherein the fast chemical reaction material of the cover has a flexural modulus ranging from 5 to 100 kpsi, wherein the golf ball has a Shore C hardness of 75.

3. The golf ball according to claim 2 further comprising at least one boundary layer disposed between the core and the cover, and the boundary layer is composed of a blend of ionomers.

4. The golf ball according to claim 2 wherein the core is a solid core composed of a polybutadiene based mixture.

5. A golf ball comprising:
   a core comprising a polybutadiene mixture;
   a boundary layer formed over the core; and
   a cover formed over the core, the cover composed of a fast chemical reaction aliphatic polyurethane material formed from reactants comprising a prepolymer comprising 1,6, hexamethylene-diisocyanate and a polytetramethylene ether glycol, and an aliphatic polyol, wherein the fast chemical reaction aliphatic polyurethane material of the cover has a flexural modulus ranging from 5 to 100 kpsi, wherein the golf ball has a Shore C hardness of 75.

* * * * *